(12) United States Patent
Frank

(10) Patent No.: US 10,190,790 B2
(45) Date of Patent: Jan. 29, 2019

(54) ENERGY EFFICIENT THERMOSTAT

(75) Inventor: Andrew Frank, Woodland Hills, CA (US)

(73) Assignee: Digi International Inc., Minnetonka, MN (US)

( * ) Notice: Subject to any disclaimer, the term of this patent is extended or adjusted under 35 U.S.C. 154(b) by 1083 days.

(21) Appl. No.: 13/534,940

(22) Filed: Jun. 27, 2012

(65) Prior Publication Data

US 2014/0000858 A1  Jan. 2, 2014

(51) Int. Cl.
G05D 23/19 (2006.01)
F24F 11/66 (2018.01)
F24F 11/30 (2018.01)
F24F 110/10 (2018.01)

(52) U.S. Cl.
CPC .......... *F24F 11/30* (2018.01); *G05D 23/1905* (2013.01); *F24F 11/66* (2018.01); *F24F 2110/10* (2018.01)

(58) Field of Classification Search
CPC ....... G05D 23/00; G05D 23/19; F24F 11/001; F24F 2011/0031; F24F 2011/0047; F24F 11/006; F24F 2011/0061; F24F 2011/0065; F24F 2011/0071
USPC ........................................................ 165/201
See application file for complete search history.

(56) References Cited

U.S. PATENT DOCUMENTS

| | | | | |
|---|---|---|---|---|
| 4,236,084 A * | 11/1980 | Gingras | ........................... | 307/39 |
| 7,476,988 B2 * | 1/2009 | Mulhouse | ................. | H02J 7/34 |
| | | | | 307/66 |
| 7,644,051 B1 * | 1/2010 | Moore et al. | .................... | 706/21 |
| 7,703,694 B2 * | 4/2010 | Mueller et al. | .................. | 236/51 |
| 2006/0123053 A1 * | 6/2006 | Scannell, Jr. | ..... | G06F 17/30035 |
| 2007/0119958 A1 * | 5/2007 | Kates | ...................... | F24F 11/006 |
| | | | | 236/1 B |
| 2007/0254727 A1 * | 11/2007 | Sewall et al. | .................. | 455/574 |
| 2010/0006660 A1 * | 1/2010 | Leen | ................... | G05D 23/1931 |
| | | | | 236/51 |

* cited by examiner

*Primary Examiner* — Larry Furdge
(74) *Attorney, Agent, or Firm* — Fogg & Powers LLC

(57) ABSTRACT

A thermostat method and apparatus has one or more demand circuits, an energy storage device; a DC regulator connected to the energy storage device, and a thermostat control connected to the DC regulator and to the energy storage device. Current is drawn from the one or more demand circuits when demand associated with the demand circuits is not active and the energy storage device is charged with the current drawn from the one or more demand circuits. If energy stored in the energy storage device is below the first predetermined threshold, activity in the thermostat is reduced and if energy stored in the energy storage device is above the second predetermined threshold, activity in the thermostat is allowed to increase.

21 Claims, 6 Drawing Sheets

ENERGY EFFICIENT THERMOSTAT

BACKGROUND

Digital thermostats need power. Operating power is typically provided from battery or from the thermostat wiring. A typical HVAC system runs on low voltage 24 VAC system and has a 110/220 VAC to 24 VAC transformer. The two sides of the transformer are typically marked as R (Return) and C (Common). Newer house wirings routes both taps of the transformer to the thermostat and thus the thermostat has direct access to this 24 VAC system and can derive its required internal supply voltages from the 24 VAC directly.

However, older houses do not typically have the C wire routed to the thermostat. Instead the C side of the terminal is routed through various demand controls, such as Fan, Heat, Cool, etc. The thermostat activates a relay and shorts these connections to the R, thus signaling a demand. When the contacts of the relays are open, the full 24 VAC is available between the various demand lines and the R. When the contacts are closed, the voltage drops to 0 VAC and the current flows from the C terminal of the 24 VAC transformer via the demand wires back to the R terminal of the transformer.

There have been on the market various power stealing methods that allow stealing power from these demand wires when the relay is open (voltage driven) and even when the relay is closed. The problem with these solutions is that they only allow a 'small' amount of power to be harvested, because if the current increases above approximately 10 mA or so in the demand line, the HVAC controller might detect a false demand on the control line. Most digital thermostats are very low power and may survive on this small amount of power harvested from one or more control lines. They may also be supported with battery backup and power stealing may be used just extend the battery life. There is also a solution that steals power from systems with a single demand line when the demand is not active, storing some of the energy in a rechargeable battery or super capacitor, and then powers the thermostat from this battery when the demand is active.

Newer thermostats are now getting network attached. Some network attached thermostats use a wireless interface and nowadays Wi-Fi is popular. The problem with a Wi-Fi attached thermostat is that it needs more power than can be stolen from an HVAC system without the C terminal. Thus this thermostat either requires the presence of the C wire or requires an external wall mount power supply.

What is needed is a system and method for powering a digital thermostat in the absence of an external power source such as a C wire or an external power supply.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
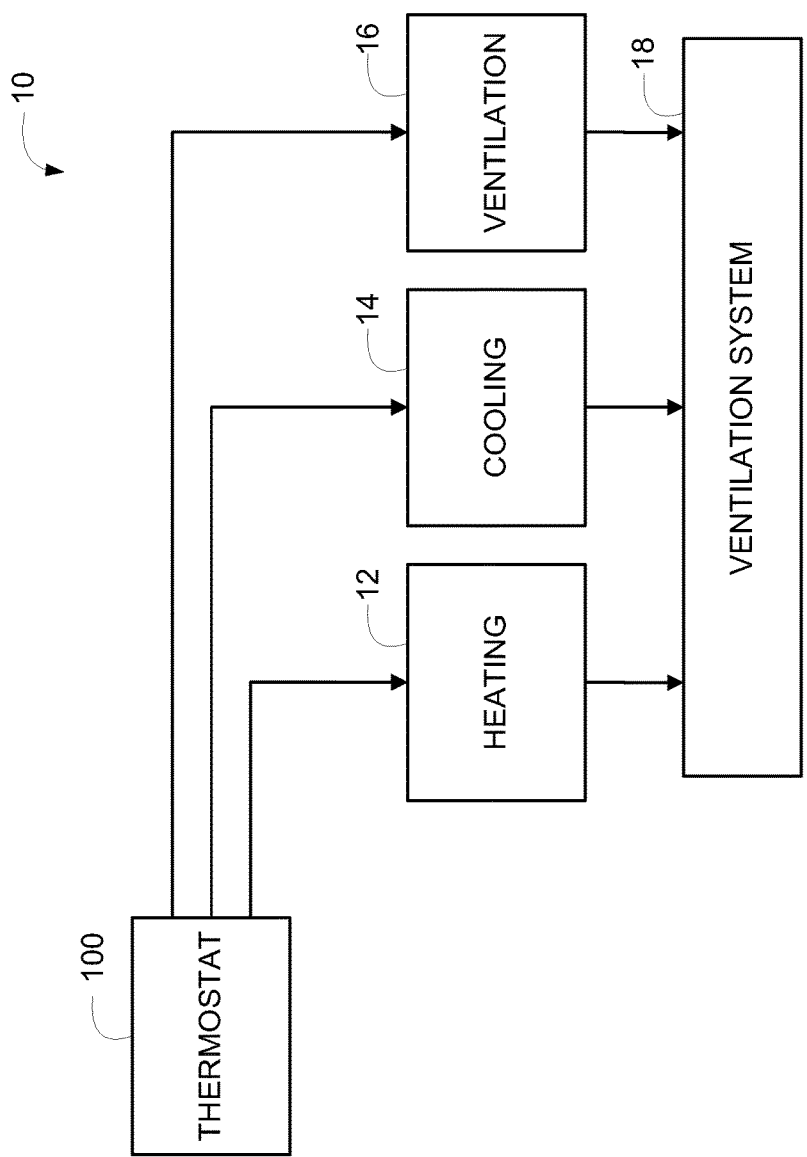
FIG. 1 illustrates an example heating, ventilation and cooling (HVAC) system.

An example heating, ventilation and cooling (HVAC) system is shown in FIG. 1. In the example shown in FIG. 1, system 10 includes a heating unit 12, a cooling unit 14 and a ventilation unit 16 connected to the ventilation system 18 used to control a building's climate. In the example shown in FIG. 1, system 10 includes a thermostat system 100 that controls each of heating unit 12, cooling unit 14 and ventilation unit 16.

Figure 2:
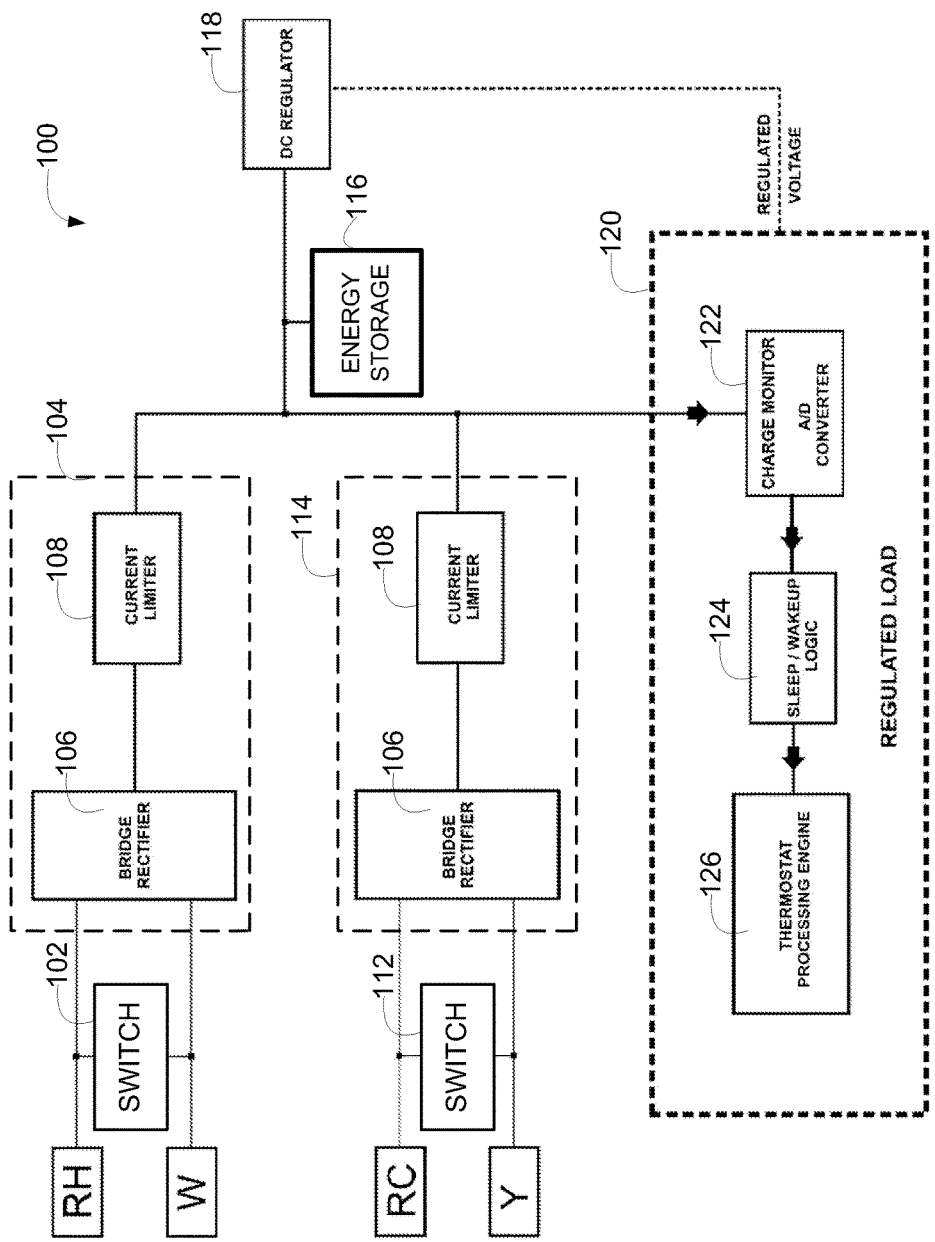
FIG. 2 illustrates an example thermostat system that can be used in the HVAC system of FIG. 1.

An example thermostat system 100 is shown in FIG. 2. In the example shown in FIG. 2, thermostat system 100 includes a first demand circuit 102 and a second demand circuit 112 connected to a first limited current source 104 and a second limited current source 114, respectively. In the example shown, limited current sources 104 and 114 include a bridge rectifier 106 connected to a current limiter 108. In the example shown, first demand circuit 102 includes a switch connected between wires RH and W; in the example shown, first demand circuit 102 serves to power a HVAC unit such as a heating unit off and on. Similarly, demand circuit 112 is connected between wires RC and Y; in the example shown in FIG. 2, second demand circuit 112 serves to power a HVAC unit such as a condenser or other cooling unit off and on. In one example embodiment, wires RH and RC provide 24 VAC to their respective HVAC units via their corresponding demand circuits 102 and 112.

In one embodiment, demand circuits 102 and 112 include relays. In another embodiment, semiconductor devices such as triacs are used in demand circuits 102 and 112 to provide power to the HVAC units.

In the example thermostat system 100 of FIG. 2, current sources 104 and 114 store energy into energy storage 116. In one such embodiment, current flows from limited current sources 104 and 114 only when the corresponding demand of the HVAC unit is turned off.

In the example embodiment shown in FIG. 2, when energy stored in energy storage 116 passes a particular threshold, thermostat control 120 wakes from a low power sleeping state. Typically, the threshold is selected to be a sufficient number of volts over the output of DC regulator 118 to ensure that DC regulator 118 is capable of driving sufficient current for a predetermined minimum time at the desired voltage to drive thermostat control 120. For a 5V power supply, the number might be 2 volts above the desired voltage, or 7 volts DC.

In one embodiment, thermostat control 120 is placed into a reduced power mode (sleep mode) if the voltage across energy storage 116 falls below a predetermined threshold.

In one embodiment, energy storage 116 is a rechargeable battery. In another embodiment, energy storage 116 is a capacitor.

In the embodiment shown in FIG. 2, thermostat control 120 includes a charge monitor 122, sleep/wakeup logic 124 and thermostat processing engine 126.

As noted above, previous attempts to power thermostats from power stolen from the demand lines required very low powered thermostat controls. It is difficult to extend such a mechanism so that it can include higher powered features such as Wi-Fi, Zigbee or other wireless devices. Thermostat system 100 solves this problem by providing at least two sources of the power needed to store energy into energy storage 116. It is unlikely that an HVAC system that supports both heating and cooling would be doing both simultaneously. The assumption is that both of these demands will rarely be activated simultaneously, thus at least one of the relays are always open providing 24 VAC to power current source 104 or 114.

In one embodiment, additional demand lines (such as second stage cooling or heating) can be used in similar configurations to provide additional power sources.

In addition, as shown in FIG. 2, in one embodiment thermostat control 120 includes sleep/wakeup logic 124 used to power down thermostat 100 when the energy stored in energy storage 116 drops below a particular threshold and wake up when it rises above a particular threshold. Such an approach allows a network attached wireless digital thermostat to work without battery, C wire or external power supply. This approach also is capable of employing a low power requirement RF network, such as a Zigbee network that can sleep most of the time and wake-up periodically, resume the network connection quickly, transfer the required data and then go back to deep sleep. The power profile of such system is for low power consumption for an extended period followed by a burst power demand for a short period in time, followed by another low power period, etc.

This burst demand for power can be harvested via power stealing over a longer period of time. By carefully selecting the ratio of the deep sleep and the active burst power, an improved power stealing system can harvest enough energy from the HVAC system without a C wire or external power supply to maintain a wireless RF Digital Thermostat operation.

In one embodiment, the system employs a constant current limiting network via current limiter 108 (adjustable, but typically less than 10 mA) to make sure that no false demand would be presented. This constant current source than would charge a rechargeable battery or a storage cap. The output of energy source 116 is then fed into a high-efficiency, wide input range, DC/DC controller 118 providing required operating voltages.

Figure 3:
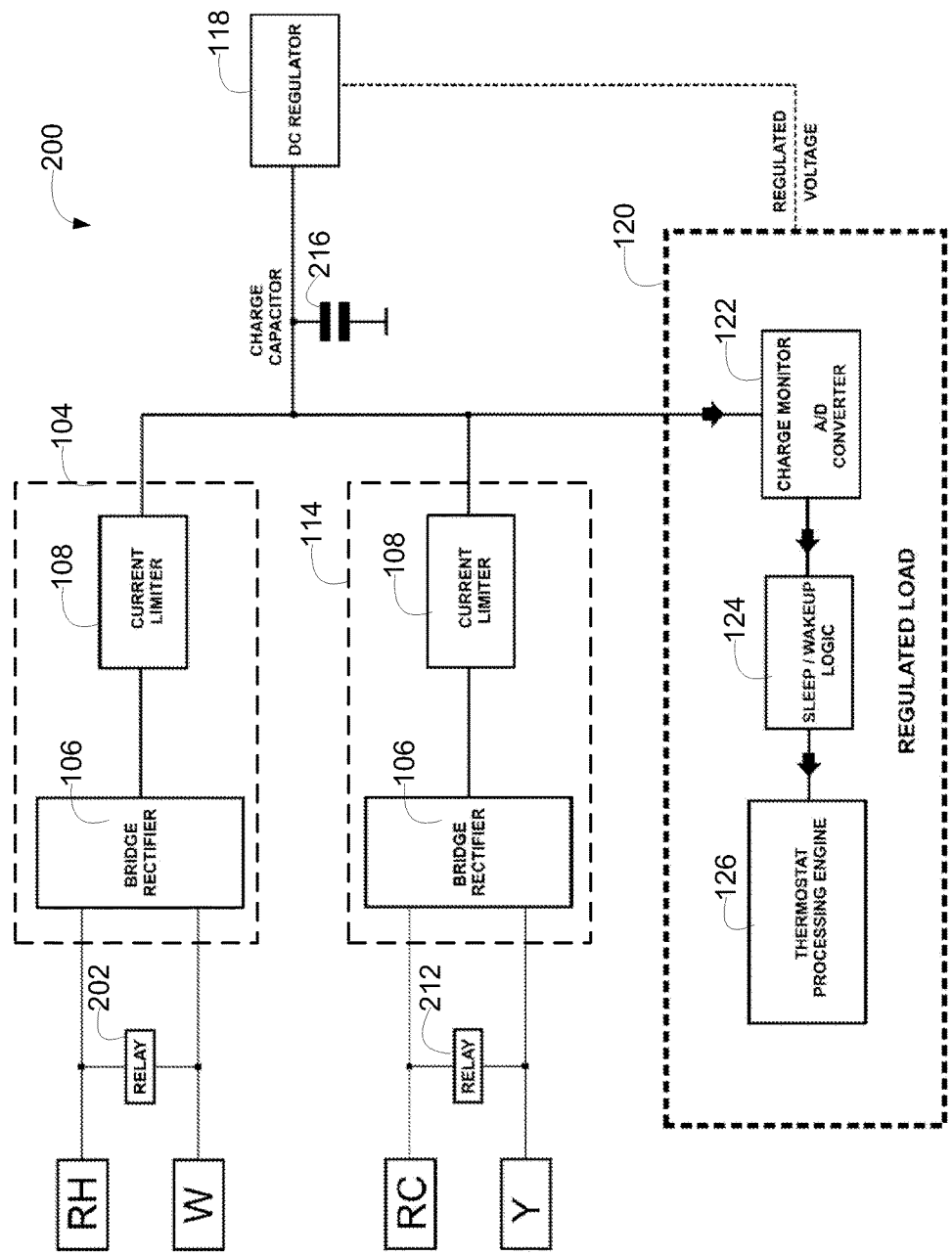
FIG. 3 illustrates another example of a thermostat system.

Another example embodiment of a thermostat system is shown in FIG. 3. In the example shown in FIG. 3, thermostat system 200 includes a first relay 202 as a first demand circuit and a second relay 212 as a second demand circuit. First relay 202 and second relay 212 are connected to a first current source 104 and a second current source 114, respectively. In the example shown, current sources 104 and 114 include a bridge rectifier 106 connected to a current limiter 108. In the example shown, first relay 202 is connected between wires RH and W, and serves to power a HVAC unit such as a heating unit off and on. Similarly, relay 212 is connected between wires RC and Y, and serves to power a HVAC unit such as a condenser or other cooling unit off and on. In one example embodiment, wires RH and RC provide 24 VAC to their respective HVAC units via their corresponding relays 202 and 212. Additional current sources may be implemented by duplicating circuit 104 for additional demand lines, such as second stage cooling or heating, if available.

In the example thermostat system 200 of FIG. 3, current sources 104 and 114 store energy into charge capacitor 216. In one such embodiment, current flows from current sources 104 and 114 only when the corresponding demand of the HVAC unit is turned off.

In the example embodiment shown in FIG. 3, when energy stored in energy storage 216 rises above a particular threshold, thermostat control 120 wakes from a sleeping state. Typically, the threshold is selected to be a sufficient number of volts over the output of DC regulator 118 to ensure that DC regulator 118 is capable of driving sufficient current at the desired voltage for a predetermined minimum cycle time to drive thermostat control 120. For a 5V power supply, the number might be 2 volts above the desired voltage, or 7 volts DC.

In one embodiment, system 200 provides an active monitoring of the energy stored in the charge capacitor 216 and forces the system to go to sleep when the energy stored in the charge capacitor 216 drops below a predetermined critical level. In one such embodiment, system 200 includes a feature that wakes the system up when the energy stored in the cap reaches a preset level. This feature may not be required in all applications, because selecting the proper duty cycle might be sufficient. Such an approach can, however, be helpful during periods when more power is needed, such as during, for instance, a code download or a Flash update.

Figure 4:
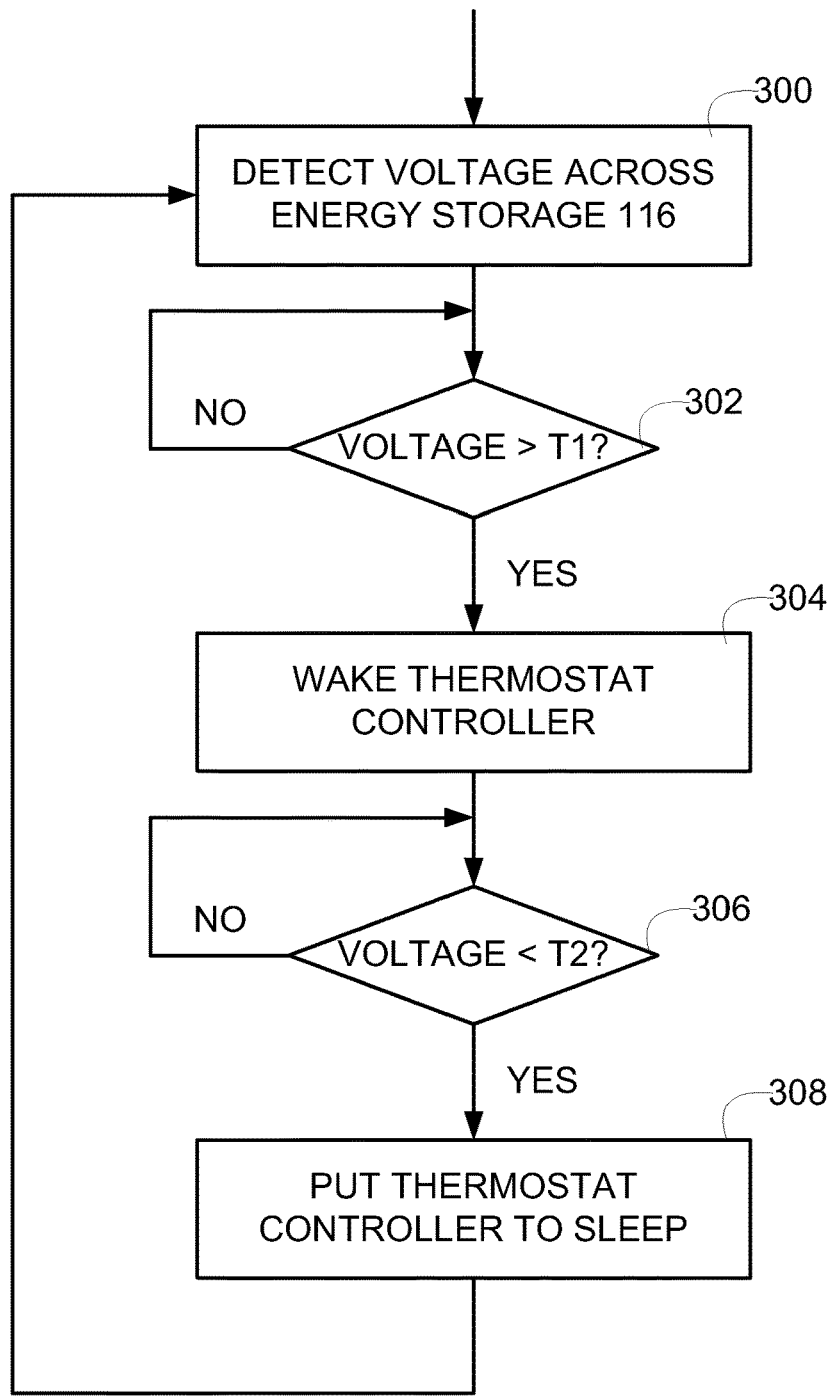
FIG. 4 illustrates a method of controlling a thermostat system.

An example of such an active monitoring approach is shown in FIG. 4. In FIG. 4, at 300, a controller detects the voltage across energy storage 116 (or charge capacitor 216 in FIG. 2) and, at 302, determines if the voltage is above a first threshold T1. If so, the controller moves to 304, the thermostat processing engine 126 is awakened and control moves to 306.

If the voltage at 302 is not above a first threshold T1, the controller waits at 302 until the voltage is above the first threshold T1.

At 306, a check is made to determine if the voltage across energy storage 116 is below a second threshold T2. If the voltage is below that threshold, control moves to 308 and the thermostat processing engine 126 is placed in a low power state, or is put to sleep. Control them moves to 300.

If the voltage at 302 is not below the second threshold T2, the controller waits at 306 until the voltage is below the second threshold T2.

Figure 5:
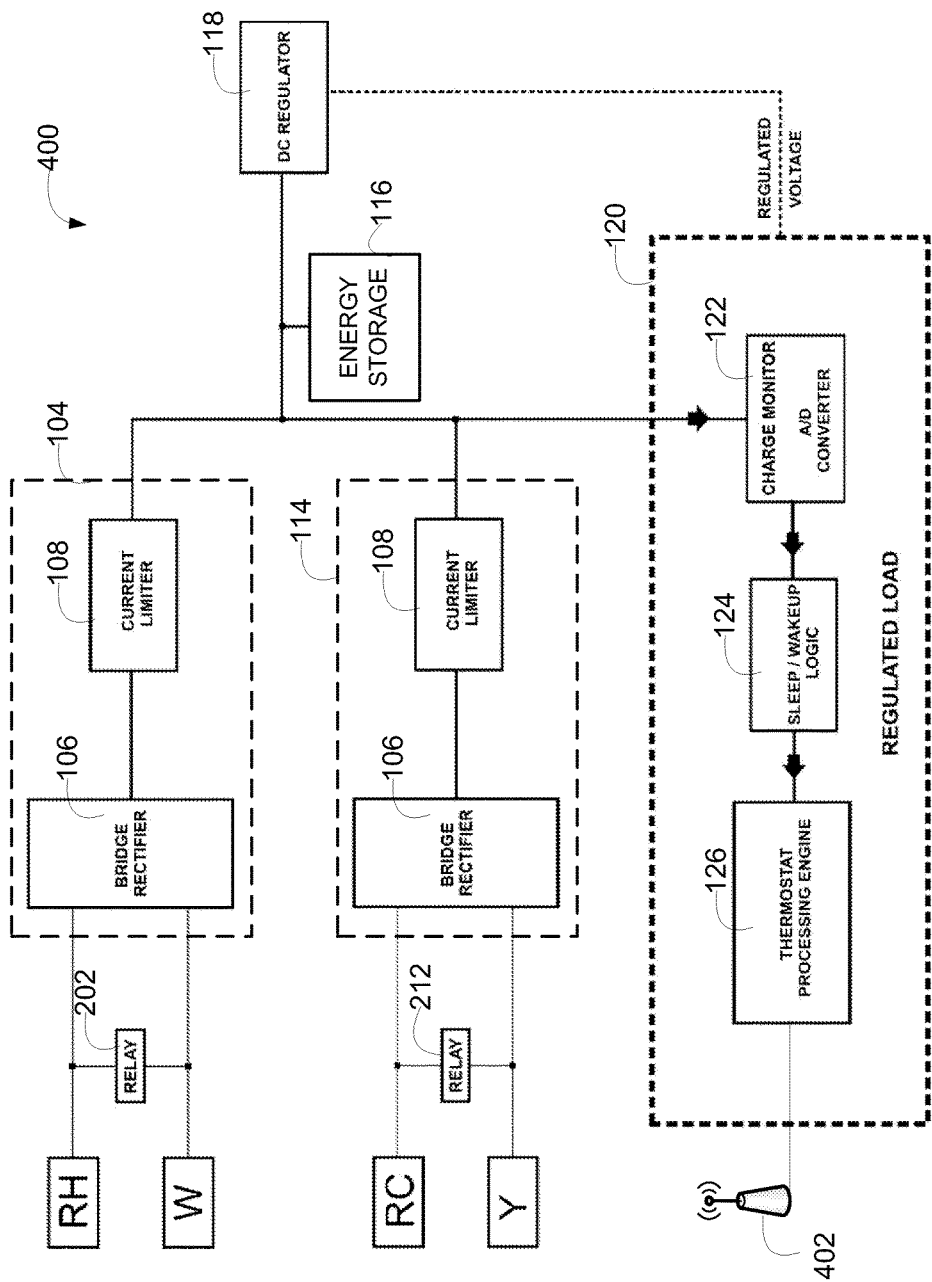
FIG. 5 illustrates an example wireless thermostat system.

In one embodiment, as is shown in FIG. 5, thermostat 400 includes a wireless interface 402. In one such example, the wireless interface is a Wi-Fi interface. In one such embodiment, thermostat 400 establishes the thermostat as a wireless node. In one embodiment, the wireless interface is a Zigbee interface.

In the example shown in FIG. 5, thermostat 400 includes a first relay 202 and a second relay 212 connected to a first current source 104 and a second current source 114, respectively. In the example shown, current sources 104 and 114 include a bridge rectifier 106 connected to a current limiter 108. Additional current sources may be implemented if additional demand lines are available. In the example shown, first relay 202 is connected between wires RH and W, and serves to power a HVAC unit such as a heating unit off and on. Similarly, relay 212 is connected between wires RC and Y, and serves to power a HVAC unit such as a condenser or other cooling unit off and on. In one example embodiment, wires RH and RC provide 24 VAC to their respective HVAC units via their corresponding relays 202 and 212.

In the example thermostat system 400 of FIG. 5, current sources 104 and 114 store energy into energy storage 116. In one such embodiment, current flows from current sources 104 and 114 only when the corresponding demand of the HVAC unit is turned off.

In the example embodiment shown in FIG. 5, when energy stored in energy storage 216 rises above a particular threshold, thermostat control 120 wakes from a sleeping state. Typically, the threshold is selected to be a sufficient number of volts over the output of DC regulator 118 to ensure that DC regulator 118 is capable of driving sufficient current at the desired voltage to drive thermostat control 120. For a 5V power supply, the number might be 2 volts above the desired voltage, or 7 volts DC. Since wireless interface 402 interface typically requires a significant amount of power, in one embodiment wireless interface 402 is only enabled when the voltage across energy storage 116 is above a second, higher, threshold.

In one embodiment, thermostat 400 provides an active monitoring of the energy stored in the energy storage 116 and forces the system to go to sleep when the energy stored in the energy storage 116 drops below a first predetermined critical level. In one such embodiment, thermostat 400 includes a feature that wakes the system up when the energy stored in energy storage 116 reaches a first preset level and that enables wireless interface 402 to operate when the energy stored in energy storage 116 reaches a second higher preset level. In one such embodiment, shut down is stepped as well. If the energy stored in energy storage 116 drops below a preset level, the wireless interface is powered down. In one such embodiment, if the energy stored in energy storage 116 drops further, the thermostat is put into a sleep mode.

Figure 6:
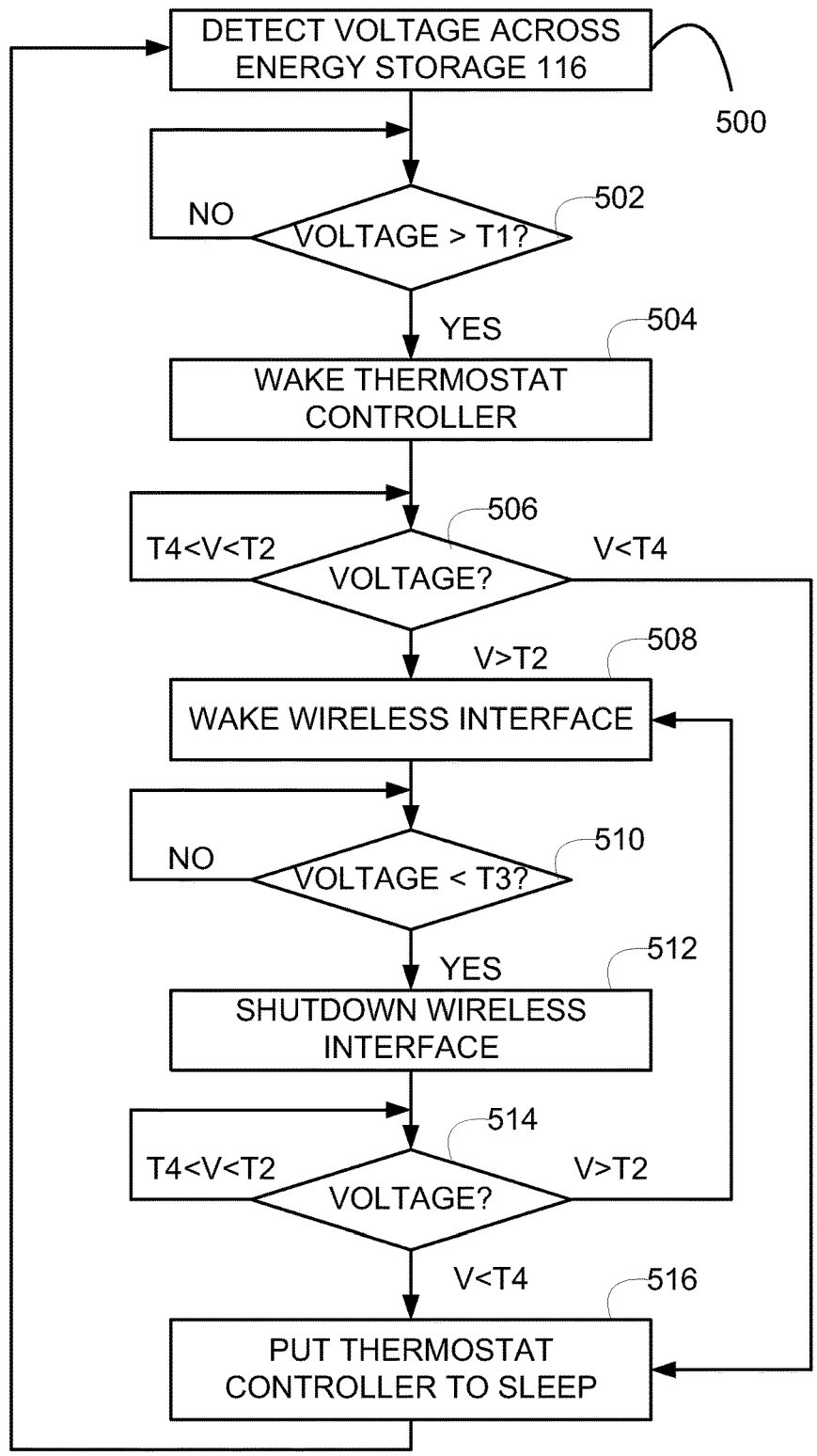
FIG. 6 illustrates another method of controlling a thermostat system.

An example of such an active monitoring approach is shown in FIG. 6. In FIG. 6, at 500, a controller detects the voltage across energy storage 116 and, at 502, determines if the voltage is above a first threshold T1. If so, the controller moves to 504, the thermostat processing engine 126 is awakened and control moves to 506.

If the voltage at 502 is not above a first threshold T1, the controller waits at 502 until the voltage is above the first threshold T1.

At 506, a check is made to determine if the voltage across energy storage 116 is above a second threshold T2 or below a threshold T4. If the voltage is above the threshold T2, control moves to 508 and wireless interface 402 is enabled. Control them moves to 510.

If the voltage at 506 is below threshold T4, the controller moves to 516 and the thermostat is put to sleep. Control then moves to 500.

If the voltage at 506 is not above the second threshold T2 and not below threshold T4, the controller waits at 506 until the voltage is above threshold T2 or below threshold T4.

At 510, a check is made to determine if the voltage across energy storage 116 is below a threshold T3. If the voltage is below that threshold, wireless interface 402 is turned off at 512 to conserve power. Control then moves to control moves to 514.

If the voltage at 510 is not below the threshold T3, the controller waits at 510 until the voltage is below the threshold T3.

At 514, a check is made to determine if the voltage across energy storage 116 is above threshold T2 or below threshold T4. If the voltage is above the threshold T2, control moves to 508 and wireless interface 402 is enabled. Control them moves to 510.

If the voltage at 514 is below threshold T4, control moves to 516 and the thermostat processing engine 126 is placed in a low power state, or is put to sleep. Control them moves to 500.

If the voltage at 514 is not above threshold T2 and not below the threshold T4, the controller waits at 514 until the voltage is above threshold T2 or below threshold T4.

As noted above, other thermostat systems typically have fairly constant power requirements. For low power they can survive on a traditional power stealing. For higher power they require the C wire or an external power supply. The solutions described above rely on the bursty power profile of an RF system and the harvesting of the required energy over time for the burst operation, thus eliminating the need for the C wire or external power supply. The system also monitors the energy stored in the storage cap and can wake the system up or forces it to go to sleep based on the level.

In addition, the above described thermostat system and method makes installation easier, faster, more bulletproof, thus lower cost. It also eliminates the need for external power supply when the C wire is not available.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A thermostat for controlling a first device and a second device in a HVAC system, comprising:
   a first demand circuit associated with the first device;
   a second demand circuit associated with the second device;
   a first limited current source and a second limited current source connected to the first and second demand circuits, respectively;
   an energy storage device connected to the first and second current sources;
   a DC regulator connected to the energy storage device; and
   a thermostat control connected to the DC regulator and to the energy storage device;
   wherein the thermostat control includes a charge monitor, sleep/wake logic and a thermostat processing engine, wherein the thermostat processing engine is configured to activate one or more of the demand circuits as a function of a heating/cooling profile, wherein the charge monitor monitors energy stored in the energy storage device; and wherein the first limited current source provides a first limited current to the energy storage device when the first demand circuit is not activated;

wherein the second limited current source provides a second limited current to the energy storage device when the second demand circuit is not activated;

wherein the sleep/wake logic is configured to place the thermostat control in alternating periods of sleep state and wake state based on the amount of energy stored in the energy storage device, power requirements of the thermostat control during periods of sleep state being less than power requirements of the thermostat control during periods of wake state;

wherein each of the first limited current and the second limited current is insufficient for power requirements of the thermostat control during periods of wake state;

wherein each of the first limited current source and the second limited current source is configured to charge the energy storage device during periods of sleep state;

wherein the sleep/wake logic is configured to maintain the sleep state of the thermostat control at least until the amount of energy on the energy storage device is sufficient for the power requirements of the thermostat control during a subsequent wake state.

2. The thermostat of claim 1, wherein the thermostat control further includes a wireless interface.

3. The thermostat of claim 2, wherein the wireless interface is a WiFi interface.

4. The thermostat of claim 2, wherein the wireless interface complies with the Zigbee wireless standard.

5. The thermostat of claim 1, wherein the sleep/wake logic supports a plurality of power levels and wherein the charge monitor activates the sleep/wake logic to reduce power used by the thermostat to a selected power level if the energy falls below one of a plurality of predetermined thresholds.

6. The thermostat of claim 5, wherein the thermostat control further includes a wireless interface and wherein one of the power levels causes power to the wireless interface to be reduced.

7. The thermostat of claim 6, wherein the wireless interface operates in burst mode when the energy storage device has sufficient energy.

8. In a thermostat having one or more demand circuits, an energy storage device; a DC regulator connected to the energy storage device, and a thermostat control connected to the DC regulator and to the energy storage device, a method of operating the thermostat, comprising:

drawing current from the one or more demand circuits when demand associated with the demand circuits is not active, wherein the current drawn from the one or more demand circuits is insufficient for power requirements of the thermostat control during a wake state;

charging the energy storage device with the current drawn from the one or more demand circuits during a sleep state, the power requirements of the thermostat control during the sleep state being less than the power requirements of the thermostat control during the wake state;

monitoring the amount of energy stored in the energy storage device;

determining whether energy stored in the energy storage device is below a first predetermined threshold;

when energy stored in the energy storage device is below the first predetermined threshold, placing the thermostat control in the sleep state to charge the energy storage device;

determining if whether energy stored in the energy storage device is above a second predetermined threshold; and when energy stored in the energy storage device is above the second predetermined threshold, placing the thermostat control in the wake state to utilize energy stored in the energy storage device.

9. The method of claim 8, wherein there are a plurality of demand circuits and wherein drawing current from the one or more demand circuits when demand associated with the demand circuits is not active includes:

selecting a first demand circuit and a second demand circuit from the plurality of demand circuits;

drawing current from a first demand circuit of the one or more demand circuits when demand associated with the first demand circuit is not active; and drawing current from a second demand circuit of the one or more demand circuits when demand associated with the second demand circuit is not active.

10. The method of claim 9, wherein selecting a first demand circuit and a second demand circuit includes determining a combination of first and second demand circuits that are usually not active simultaneously.

11. A thermostat for controlling a HVAC system having a plurality of devices, comprising:

a plurality of demand circuits, wherein each demand circuit is associated with one of the devices;

a plurality of limited current sources, wherein each limited current source is connected to one of the plurality of demand circuits;

an energy storage device connected to each of the plurality of limited current sources;

a DC regulator connected to the energy storage device; and a thermostat control connected to the DC regulator and to the energy storage device;

wherein the thermostat control includes a charge monitor, sleep/wake logic and a thermostat processing engine, wherein the thermostat processing engine is configured to activate one or more of the demand circuits as a function of a heating/cooling profile, wherein the charge monitor monitors energy stored in the energy storage device; and wherein each of the limited current sources provides a respective limited current to the energy storage device when the respective demand circuit is not activated;

wherein the sleep/wake logic is configured to place the thermostat in alternating periods of sleep state and wake state based on the amount of energy stored in the energy storage device, power requirements of the thermostat control during periods of sleep state being less than power requirements of the thermostat control during periods of wake state;

wherein each respective limited current is insufficient for power requirements of the thermostat control during periods of wake state;

wherein each of the plurality of limited current sources is configured to charge the energy storage device during periods of sleep state;

wherein the sleep/wake logic is configured to maintain the sleep state of the thermostat control at least until the amount of energy on the energy storage device is sufficient for the power requirements of the thermostat control during a subsequent wake state.

12. The thermostat of claim 11, wherein the thermostat control further includes a wireless interface.

13. The thermostat of claim 11, wherein the wireless interface is a WiFi interface.

14. The thermostat of claim 11, wherein the wireless interface complies with the Zigbee wireless standard.

15. The thermostat of claim 11, wherein the sleep/wake logic supports a plurality of power levels and wherein the charge monitor activates the sleep/wake logic to reduce power used by the thermostat to a selected power level if the energy falls below one of a plurality of predetermined thresholds.

16. The thermostat of claim 15, wherein the thermostat control further includes a wireless interface and wherein one of the power levels causes power to the wireless interface to be reduced.

17. A heating, ventilation and cooling (HVAC) system, comprising:
a plurality of devices, wherein each device performs some aspect of heating, cooling or ventilation; and
a thermostat, wherein the thermostat includes:
a plurality of demand circuits, wherein each demand circuit is associated with one of the devices;
a plurality of limited current sources, wherein each limited current source is connected to one of the plurality of demand circuits;
an energy storage device connected to each the plurality of limited current sources;
a DC regulator connected to the energy storage device; and
a thermostat control connected to the DC regulator and to the energy storage device;
wherein the thermostat control includes a charge monitor, sleep/wake logic and a thermostat processing engine, wherein the thermostat processing engine is configured to activate one or more of the demand circuits as a function of a heating/cooling profile, wherein the charge monitor monitors energy stored in the energy storage device; and
wherein each of the limited current sources provides a respective limited current to the energy storage device when the respective demand circuit is not activated;
wherein the sleep/wake logic is configured to place the thermostat in alternating periods of sleep state and wake state based on the amount of energy stored in the energy storage device, power requirements of the thermostat control during periods of sleep state being less than power requirements of the thermostat control during periods of wake state;
wherein each respective limited current is insufficient for power requirements of the thermostat control during periods of wake state;
wherein each of the plurality of limited current sources is configured to charge the energy storage device during periods of sleep state;
wherein the sleep/wake logic is configured to maintain the sleep state of the thermostat control at least until the amount of energy on the energy storage device is sufficient for the power requirements of the thermostat control during a subsequent wake state.

18. The system of claim 17, wherein the thermostat control further includes a wireless interface.

19. The system of claim 17, wherein the wireless interface is a WiFi interface.

20. The system of claim 17, wherein the wireless interface complies with the Zigbee wireless standard.

21. The system of claim 17, wherein the sleep/wake logic supports a plurality of power levels and wherein the charge monitor activates the sleep/wake logic to reduce power used by the thermostat to a selected power level if the energy falls below one of a plurality of predetermined thresholds.

* * * * *